(12) United States Patent
Witt

(10) Patent No.: US 9,791,020 B2
(45) Date of Patent: Oct. 17, 2017

(54) V-RIBBED BELT WITH SPACED RIB FLANK REINFORCEMENT

(71) Applicant: Richard J. Witt, Fayetteville, AR (US)

(72) Inventor: Richard J. Witt, Fayetteville, AR (US)

(73) Assignee: Dayco IP Holdings, LLC, Troy, MI (US)

( * ) Notice: Subject to any disclaimer, the term of this patent is extended or adjusted under 35 U.S.C. 154(b) by 22 days.

(21) Appl. No.: 14/854,510

(22) Filed: Sep. 15, 2015

(65) Prior Publication Data

US 2016/0010723 A1    Jan. 14, 2016

Related U.S. Application Data

(63) Continuation of application No. 13/827,602, filed on Mar. 14, 2013, now Pat. No. 9,157,503.

(51) Int. Cl.
| | | |
|---|---|---|
| *F16G 1/00* | (2006.01) | |
| *F16G 5/00* | (2006.01) | |
| *F16G 9/00* | (2006.01) | |
| *F16G 5/08* | (2006.01) | |
| *F16G 5/20* | (2006.01) | |
| *F16G 5/06* | (2006.01) | |

(52) U.S. Cl.
CPC ............... *F16G 5/08* (2013.01); *F16G 5/06* (2013.01); *F16G 5/20* (2013.01); *Y10T 29/49826* (2015.01)

(58) Field of Classification Search
CPC ..... F16G 5/20; F16G 5/06; F16G 1/28; C08L 23/16; C08L 21/00
USPC .................................................. 474/260, 263
See application file for complete search history.

(56) References Cited

U.S. PATENT DOCUMENTS

| | | | | |
|---|---|---|---|---|
| 1,911,496 | A | * | 5/1933 | Freedlander ............... F16G 5/08 474/251 |
| 3,485,707 | A | * | 12/1969 | Spicer ....................... C25B 1/26 198/847 |
| 3,818,741 | A | | 6/1974 | Terhune |
| 4,169,393 | A | | 10/1979 | Wetzel et al. |
| 4,432,744 | A | | 2/1984 | Imamura et al. |

(Continued)

FOREIGN PATENT DOCUMENTS

| | | |
|---|---|---|
| CN | 1982743 | 6/2007 |
| FR | 2503305 | 10/1982 |

OTHER PUBLICATIONS

CN, Office Action and Search Report with English translations; Chinese Patent Application No. 2014800151048 (Oct. 8, 2016).
EP, Extended European Search Report; European Patent Application No. 14776399.9 (Oct. 25, 2016).
FTC Products, Tyre Cord Plant, http://www.ftc.com.tw/ftc29e.htm (at least as early as Jun. 6, 2012).
Shandong Hualian Group Co., Ltd., Dipped Nylon Belting Fabrics, http://henglihua.en.made-in-china.com/product/IbJnQWAxoRYe/China-Dipped-Nylon-Belting-Fabrics.html (at least as early as Jun. 6, 2012).
PCT, International Search Report and Written Opinion, PCT/US2014/017957 (Jun. 18, 2014).
US, Non-Final Office Action; U.S. Appl. No. 13/827,602 (Feb. 20, 2015).
US, Notice of Allowance; U.S. Appl. No. 13/827,602 (Aug. 10, 2015).

*Primary Examiner* — Henry Liu
(74) *Attorney, Agent, or Firm* — FisherBroyles, LLP; Susan M. Olier

(57) ABSTRACT

V-ribbed belts with spaced rib flank reinforcement and methods of making the same are disclosed. The V-ribbed belt comprises a compression section having at least one laterally spaced, longitudinally extending V-rib having first and second longitudinally extending flanks. The V-rib (Continued)

includes an elastomeric material having a dry coefficient of friction encapsulating a plurality of reinforcing bodies having a dry coefficient of friction that is less than that of the elastomeric material. The plurality of reinforcing bodies are arranged generally laterally within the V-rib such that at least a portion of the reinforcing bodies forms part of one or more of the first and second longitudinally extending flanks.

20 Claims, 8 Drawing Sheets

(56) References Cited

U.S. PATENT DOCUMENTS

| | | | | |
|---|---|---|---|---|
| 4,555,241 | A | 11/1985 | Takano et al. | |
| 4,632,665 | A * | 12/1986 | Skura | B29D 29/08 474/205 |
| 4,892,510 | A | 1/1990 | Matsuoka et al. | |
| 4,931,118 | A * | 6/1990 | Kitahama | B29C 43/021 156/138 |
| 4,936,814 | A * | 6/1990 | Colley | B29C 70/14 152/547 |
| 5,120,281 | A * | 6/1992 | Mishima | F16G 1/28 474/263 |
| 5,197,928 | A * | 3/1993 | Mishima | B29C 70/545 156/137 |
| 5,230,668 | A * | 7/1993 | Kawashima | F16G 5/20 474/263 |
| 5,244,436 | A * | 9/1993 | Kurokawa | F16G 5/06 474/260 |
| 5,250,010 | A * | 10/1993 | Mishima | F16G 1/28 474/263 |
| 5,387,160 | A * | 2/1995 | Nakajima | C08K 5/39 428/423.1 |
| 5,413,538 | A * | 5/1995 | Mishima | F16G 1/28 474/263 |
| 5,415,594 | A * | 5/1995 | Kitahama | F16G 1/28 474/263 |
| 5,427,637 | A * | 6/1995 | Mishima | B29C 70/545 156/137 |
| 5,498,212 | A * | 3/1996 | Kumazaki | F16G 5/20 474/263 |
| 5,498,213 | A * | 3/1996 | Mishima | F16G 5/20 474/263 |
| 5,674,143 | A * | 10/1997 | Kumazaki | F16G 5/20 474/263 |
| 5,891,561 | A * | 4/1999 | Kinoshita | F16G 5/06 428/295.1 |
| 5,904,630 | A * | 5/1999 | Berthelier | B29D 29/103 474/263 |
| 6,176,799 | B1 * | 1/2001 | Kinoshita | F16G 1/28 428/337 |
| 6,358,171 | B1 * | 3/2002 | Whitfield | B29D 29/08 474/263 |
| 6,491,598 | B1 * | 12/2002 | Rosenboom | B32B 25/14 428/515 |
| 6,511,394 | B2 * | 1/2003 | Okuno | C08L 23/16 474/237 |
| 6,558,282 | B2 | 5/2003 | Danhauer et al. | |
| 6,561,937 | B1 * | 5/2003 | Wegele | F16G 1/08 474/263 |
| 6,695,735 | B2 * | 2/2004 | Tani | F16G 5/20 474/260 |
| 6,758,779 | B2 * | 7/2004 | Fujimoto | B32B 25/02 474/260 |
| 6,793,599 | B2 | 9/2004 | Patterson et al. | |
| 6,824,485 | B2 * | 11/2004 | Edwards | F16G 5/20 474/260 |
| 6,866,922 | B2 * | 3/2005 | Takehara | F16G 1/08 428/295.1 |
| 7,128,674 | B2 * | 10/2006 | Teves | F16G 1/06 474/238 |
| 7,244,207 | B2 * | 7/2007 | Shiriike | F16G 5/20 474/260 |
| 7,896,767 | B2 | 3/2011 | Nakashima | |
| 7,988,577 | B2 * | 8/2011 | Omori | F16G 5/20 474/238 |
| 8,882,621 | B2 * | 11/2014 | Nakashima | F16G 1/08 474/260 |
| 8,974,336 | B2 * | 3/2015 | Nakashima | F16G 1/10 428/221 |
| 2001/0034282 | A1 * | 10/2001 | Hasaka | B29D 29/10 474/260 |
| 2001/0056003 | A1 * | 12/2001 | Tani | F16G 5/20 474/263 |
| 2002/0004434 | A1 * | 1/2002 | Tani | F16G 5/20 474/263 |
| 2002/0004435 | A1 * | 1/2002 | Tani | F16G 5/20 474/263 |
| 2002/0032091 | A1 * | 3/2002 | Okuno | C08L 23/16 474/260 |
| 2002/0039947 | A1 * | 4/2002 | Hasaka | F16G 1/06 474/263 |
| 2002/0183153 | A1 * | 12/2002 | Patterson | B29D 29/08 474/263 |
| 2002/0193196 | A1 * | 12/2002 | Tani | F16G 5/20 474/263 |
| 2003/0017900 | A1 * | 1/2003 | Kopang | B29D 29/00 474/260 |
| 2003/0032514 | A1 * | 2/2003 | Edwards | F16G 5/20 474/263 |
| 2003/0050143 | A1 * | 3/2003 | Gregg | F16G 1/08 474/263 |
| 2003/0073533 | A1 * | 4/2003 | Knutson | B29D 29/08 474/263 |
| 2003/0078125 | A1 * | 4/2003 | Knutson | B29D 29/08 474/260 |
| 2003/0139242 | A1 * | 7/2003 | Teves | F16G 1/06 474/263 |
| 2004/0009839 | A1 * | 1/2004 | Edwards | F16G 5/20 474/260 |
| 2004/0018906 | A1 * | 1/2004 | Sedlacek | F16G 5/20 474/260 |
| 2004/0048708 | A1 * | 3/2004 | Nonnast | F16G 5/20 474/260 |
| 2004/0063532 | A1 * | 4/2004 | Nakamoto | F16G 5/20 474/267 |
| 2004/0214676 | A1 * | 10/2004 | Shiriike | F16G 5/20 474/260 |
| 2005/0003918 | A1 * | 1/2005 | Hayashi | F16G 5/20 474/263 |
| 2005/0037882 | A1 * | 2/2005 | Hineno | C08L 21/00 474/263 |
| 2005/0143209 | A1 * | 6/2005 | Shibutani | F16G 5/20 474/260 |
| 2006/0105873 | A1 * | 5/2006 | Sato | F16G 5/06 474/263 |
| 2006/0154770 | A1 * | 7/2006 | Takaba | F16G 5/20 474/263 |
| 2007/0060431 | A1 * | 3/2007 | Hineno | F16G 5/20 474/263 |
| 2007/0249451 | A1 * | 10/2007 | Wu | F16G 1/28 474/263 |
| 2007/0249452 | A1 * | 10/2007 | South | F16G 5/20 474/263 |
| 2008/0026897 | A1 * | 1/2008 | Nakashima | F16G 5/04 474/263 |
| 2009/0048048 | A1 * | 2/2009 | Nakamura | B29D 29/103 474/263 |
| 2009/0149289 | A1 * | 6/2009 | Cheong | F16G 5/20 474/263 |
| 2009/0298633 | A1 * | 12/2009 | Hineno | F16G 5/06 474/263 |
| 2010/0167861 | A1 * | 7/2010 | Shiriike | F16G 1/08 474/263 |
| 2010/0203994 | A1 * | 8/2010 | Fujikawa | C08K 3/04 474/263 |
| 2010/0298079 | A1 | 11/2010 | Shiriike et al. | |

(56) References Cited

U.S. PATENT DOCUMENTS

| | | | |
|---|---|---|---|
| 2011/0218069 A1* | 9/2011 | Nakashima | F16G 1/08 474/260 |
| 2012/0058849 A1* | 3/2012 | Yoshida | B29D 29/103 474/148 |
| 2013/0085028 A1* | 4/2013 | Yamada | F16G 5/08 474/263 |
| 2013/0217528 A1* | 8/2013 | Matsumoto | F16G 1/10 474/263 |

* cited by examiner

V-RIBBED BELT WITH SPACED RIB FLANK REINFORCEMENT

RELATED APPLICATIONS

This application is a continuation of U.S. application Ser. No. 13/827,602, filed Mar. 14, 2013.

TECHNICAL FIELD

This invention relates to power transmission belts and, more particularly, to an improved V-ribbed belt with spaced rib flank reinforcement for consistent belt performance under both dry and wet operating conditions.

BACKGROUND

V-belts and V-ribbed belts are used in a wide range of environments. V-ribbed belts are preferred for their high power transmission capability, which is attributable to the large contact area between the ribs on the belt and the flank on the cooperating pulleys.

In operation, there is a tendency for V-belts and V-ribbed belts to emit noise; a common complaint, especially on automotive drives. Belt noise is predominately the result of pulley engagement and disengagement noise arising as the ribs on the belt enter into and exit from the pulley grooves or arising from excessive rotational slip of the pulley relative to the belt. Rotational slip occurs during rapid acceleration or deceleration of the drive such as is encountered during shifting, engine startup or engine shutdown or due to excessive loading or insufficient wrapping around the pulleys.

It is preferable to have adequate and consistent traction between V-ribs on the belt and the pulley grooves in both wet and dry operating conditions. A common method of quantifying the traction level is by reference to the "effective coefficient of friction" ($\mu_e$) as defined in SAE J2432, the entirety of which is incorporated by reference herein. Conventional V-ribbed belts have $\mu_e$ values ranging from about 0.4 to 2.1, but the preferred range for automotive accessory drives is about 0.7 to 1.5.

The effective coefficient of friction for existing V-rib belts generally varies drastically depending upon the environmental conditions at the time of use. In wet conditions, $\mu_e$ is at the lower end of the range due to the lubricating effect of water between the belt and pulley flanks, and in dry conditions $\mu_e$ is at the higher end of the range. Therefore, to achieve the goal of consistent fraction in both dry and wet operating conditions, it is necessary to simultaneously lower the dry traction level while increasing the wet traction level.

SUMMARY

In one aspect, disclosed are V-ribbed belts for a mechanical power transmission. The V-ribbed belts include a compression section having at least one laterally spaced, longitudinally extending V-rib. The V-rib has a first dry coefficient of friction, and includes a plurality of reinforcing bodies arranged generally laterally within the V-rib such that at least a portion of the reinforcing bodies form part of an outer surface of the V-rib. The reinforcing bodies have a secondary coefficient of friction. The first dry coefficient of friction is greater than the second dry coefficient of friction, and the resulting compression section creates an outer surface of the V-rib that has a wet effective coefficient of friction that is increased compared to conventional belts. These V-ribbed belts are beneficial because the coefficient of friction in dry conditions is substantially equal to the coefficient of friction in wet conditions. Such a belt provides consistent performance to the engine.

Consistency in effective coefficient of friction is achieved in both dry and wet conditions because the compression of the elastomeric material allows the reinforcing bodies to protrude relative to the rest of the compression section, which decreases $\mu_e$ in dry conditions due to the significant amount of surface area of the V-rib attributable to the reinforcing bodies, yet increases $\mu_e$ in wet conditions due to the disruptive effect the protuberances have on the lubricating effect of water between the belt and pulley flanks.

In another aspect, V-ribbed belts are disclosed that include a compression section having at least one laterally spaced, longitudinally extending V-rib, the V-rib having a first longitudinally extending flank and a second longitudinally extending flank. The compression section includes an elastomeric material encapsulating the reinforcing elements. A plurality of elongate reinforcing bodies are arranged generally laterally between the flanks with at least a portion of the ends of the reinforcing bodies at the surface of both the first longitudinally extending flank and the second longitudinally extending flank. There may be about 250 elongate reinforcing bodies per square inch to about 2500 elongate reinforcing bodies per square inch in the compression section.

In one embodiment, the compression section of V-ribbed belts have improved durability to resist lateral compression loads, yet retains maximal flex life and crack resistance because the elastomeric material encapsulating the reinforcing bodies is preferably homogeneous as opposed to containing fiber loading.

In yet another aspect, a method of manufacture of the V-ribbed belts is disclosed. The method includes the steps of forming a belt having generally elongate reinforcing bodies running generally laterally through a compression section and cutting V-ribs into the compression section. The resultant V-ribs have generally flat longitudinal flanks, and the ends of the reinforcing bodies comprise a portion of the surface area of the flanks.

DETAILED DESCRIPTION

The preferred embodiments of the improved V-ribbed belt 102 are described below with reference to the accompanying figures. While the various features of this invention are hereinafter illustrated and described with reference to the figures, it is to be understood that the invention is broader in scope and not limited to just those embodiments that are pictured.

Figure 1:
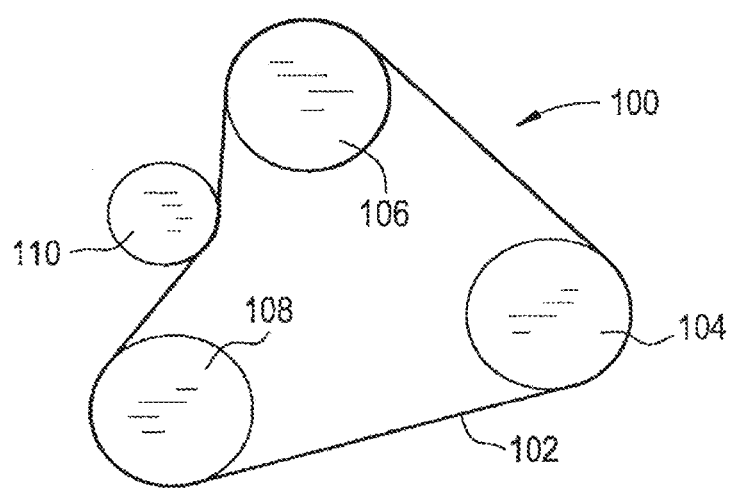
FIG. 1 is a schematic elevation illustrating a V-ribbed belt engaged with front-side and back-side pulleys.

Referring to FIG. 1, a serpentine belt drive system, generally designated 100, may include a V-ribbed belt 102, a front-side driver pulley 108, one or more driven front-side accessory pulleys 104,106, and one or more back-side pulleys 110. The drive system 100 depicted in FIG. 1 is only one example of a drive system configuration. Many alternate arrangements are known in the art and are suitable for use with the present invention.

Figure 2A:
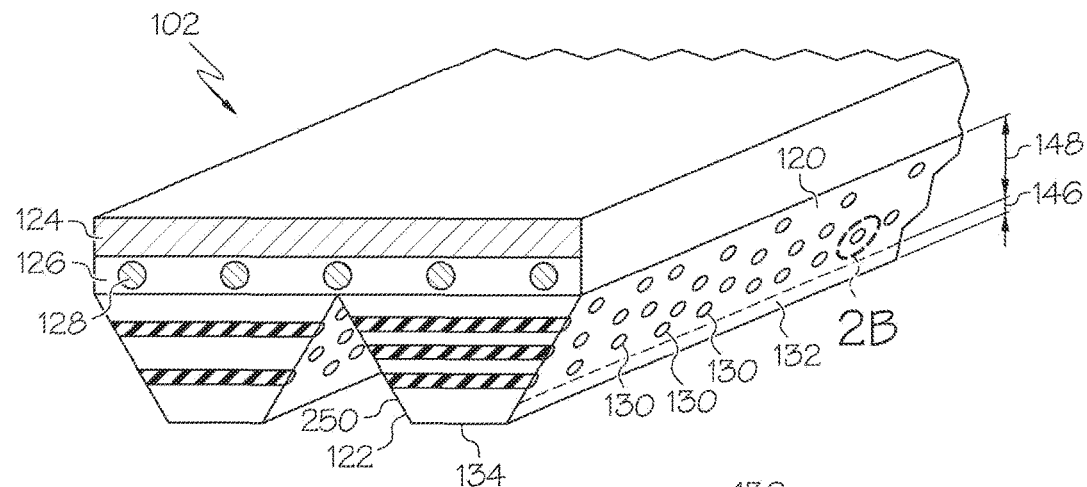
FIG. 2A is an isometric cross-sectional view of an embodiment of a V-ribbed belt with spaced rib flank reinforcement.

FIG. 2A depicts, in isometric cross-section, one embodiment of the V-ribbed belt with spaced rib flank reinforcement. The V-ribbed belt 102 includes a compression section 120 having a plurality of laterally spaced, longitudinally extending V-ribs 122, a tension section 124, and a load-carrying section 126 between the compression and tension sections. The load carrying section may include load-carrying cords 128. The V-ribbed belt 102 may be in any of several cross-sectional sizes, referred to as (US) PVH, PVJ, PVK, PVL, and PVM, (ISO) PH, PJ, PK, PL, and PM, in ascending order of pitch between the ribs. The compression section 120, tension section 124, and load-carrying section 126 of the V-ribbed belt 102 may be made from elastic compounds, fabrics, and cords, using known techniques.

The V-ribbed belt 102 may be configured to engage one or more pulleys. Frictional contact between the pulleys and the belt allows the belt to drive or be driven by the pulleys. Insufficient friction results in slippage and increased noise. The V-ribs 122 of the compression section 120 may be configured to engage one or more front-side pulleys 104, 106, 108, and the tension section may be configured to engage one or more back-side pulleys 110. The tension section 124 may be flat-faced with a smooth belt-receiving surface, or it may be modified for improved frictional contact as described in U.S. Pat. No. 8,192,315, the entirety of which is incorporated by reference herein, or with textured surfaces, or fabric covered surfaces of various options known to those skilled in the art.

Still referring to FIG. 2A, each V-rib has a first longitudinally extending flank 132 and a second longitudinally extending flank 250, and each longitudinally extending flank has a surface designed to engage with the surface of a pulley or other object (not shown). The surfaces of the flanks 132, 250 may preferably be flat when the compression section 120 is in an uncompressed state. As used herein the word "flat" means generally planar and without protuberances, bumps, or intentional texturing.

The compression section 120 is made of a material with a first coefficient of friction of about 0.3 to about 1.1, preferably about 0.4 to about 0.9, when measured dry against steel. The material may be elastomeric, and in one embodiment, may preferably be natural or synthetic rubber. In another embodiment, the material may be ethylene propylene diene monomer (EPDM) based rubber. The material is preferably homogeneous to maximize flex life and crack resistance in the belt, but it may be loaded with a limited amount of fiber as described in U.S. Pat. No. 6,793,599, the entirety of which is incorporated by reference herein.

Included in the compression section 120 is a plurality of reinforcing bodies 130 made of a material with a second coefficient of friction, which is less than that of the surrounding material in the compression section 120. The second coefficient of friction may be about 0.02 to about 0.3, more preferably about 0.1 to about 0.3, when measured dry against steel. The plurality of reinforcing bodies are arranged generally laterally within each of the V-ribs 122 (i.e., across its width) such that at least a portion of the reinforcing bodies 130, preferably cut ends thereof, form part of at least one or both of the longitudinally extending outer surfaces or flanks 132, 250 of the V-ribs 122. As a result, the outer surfaces 132 of the V-ribs are comprised generally of the preferably elastomeric material but with relatively large disruptions where the reinforcing bodies 130 extend to the surface of the V-ribs. In one embodiment, as seen in the end plan view of FIG. 6, the spacing and precise angling of the elongate reinforcing bodies 130 is non-uniform, meaning that the reinforcing bodies 130 are not strictly aligned with reference to any particular plane or reference point of the belt, but rather incorporate a degree of randomness or variation in precise orientation within each V-rib 122.

The orientation of the elongate reinforcing bodies 130 as described herein strengthen the V-ribbed belt 102 by providing resistance to lateral compression loads. Because the majority of the reinforcing bodies 130 are positioned laterally within the compression section 120 (parallel to a transverse cross-section of the belt 102), and therefore have minimal longitudinal depth, a V-ribbed belt 102 is less susceptible to cracking and has good flex life. Further, the elastomeric material within the compression section 120 is preferably homogeneous and formulated for high elongation as opposed to containing a fiber loading, which further maximizes flex life and crack resistance by minimizing disruptions in the internal structure of the elastomeric material and providing high extensibility between the reinforcing bodies.

The resulting compression section 120, once the bundles are included therein, has a coefficient of friction with a value between the first dry coefficient of friction for the material encapsulating the bundles, which have the second dry coefficient of friction, such that the resulting effective coefficient of friction of the compression section is about 0.7 to about 1.6.

Referring now to FIG. 2A, as illustrated, the compression section 120 may be viewed as having a one-third portion 146 extending from the tip 134 of each V-rib 122 toward the load carrying section 126 and a two-thirds portion 148 between the one-third portion 146 and the load carrying section 126. In one embodiment, the reinforcing bodies 130 are disposed within the compression section 120 such that about 0% to about 40% of the reinforcing bodies 130 are located within the one-third portion 146. Conversely stated, about 100% to about 60% of the reinforcing bodies 130 are located within the two-third portion 148. This enhances the belt 102 by ensuring that the elastomeric material matrix at the tip portion 134 of each V-rib 122 is not weakened by an overabundance of reinforcing bodies 130 that may function as crack initiation areas, thereby minimizing the risk of early crack formation in the tip.

The reinforcing bodies 130 may be cords. In one embodiment, the cords may be Nylon 6 or Nylon 66 of 200 to 9000 denier, or a mixture thereof. In another embodiment, the cords may be polyester, cotton, polyamide, aramid, rayon, graphite, carbon, fiberglass, and any other available fibrous material, including Nylon 6 and Nylon 66, and mixtures of any of these materials with a resulting denier of 200 to 9000.

Figure 2B:
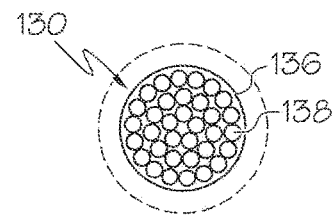
FIG. 2B is an enlarged view of a material bundle included in FIG. 2A.

Depending upon the manufacturer, the cords, reinforcing bodies 130, may be solid rods or fibers, but preferably comprise bundles 136 of fibers 138, as seen in enlarged view FIG. 2B. The bundles 136 may have diameters between about 0.1 mm and about 0.8 mm, and may be spaced within the compression section 120 as about 250 bundles per square inch to about 2500 bundles per square inch with a spacing that achieves about 750 bundles per square inch at the cut longitudinally extending first and second flanks of the V-ribs. In one embodiment, the bundles 136 have a diameter between 0.11 mm and 0.76 mm. In other embodiments, the bundles 136 are spaced within the compression section 120 as about 260 bundles per square inch, about 520 bundles per square inch, about 800 bundles per square inch, about 1200 bundles per square inch, 1600 bundles per square inch, 2400 bundles per square inch, and 3000 bundles per square inch. The reinforcing bodies 130, regardless of whether they are solid or comprised of bundles 136 of material 138, are generally spaced non-uniformly throughout the compression section 120, and the reinforcing bodies 130 may vary in size.

While the reinforcing bodies 130 are depicted in the figures as having generally circular cross-sections, one skilled in the art will appreciate that the cross-section of the reinforcing bodies 130 is not limited thereto. In other embodiments, the cross-section of the reinforcing bodies 130 may be rectangular, triangular, hexagonal, oval, or any other shape, including irregular shapes, and the cross-section need not be uniform throughout the length of an individual reinforcing body 130, nor must the cross-section be uniform with respect to all reinforcing bodies 130 contained within a specific embodiment.

As will be described in more detail below, as a result of the exposed presence of the reinforcing bodies 130 on the longitudinally-extending outer surface 132 of each V-rib 122, the effective coefficient of friction of the outer surface 132 of each V-rib 122 and the belt 102 as a whole is reduced when the belt is operated under/in dry conditions (compared to a V-rib belt of the same general construction except that it lacks the disclosed reinforcing bodies). Under dry conditions, the presence of the lower coefficient of friction reinforcing bodies 130 dispersed throughout the outer surface 132 of the disclosed V-ribs 122 reduces the effective coefficient of friction of each V-rib flank by impacting the average dry coefficient of friction of the surface 132. Further, the effective coefficient of friction of the outer surface 132 of each V-rib 122 and the belt 102 as a whole is increased when the belt is operated under/in wet conditions. In wet conditions, where the coefficient of friction of a conventional V-rib is at a minimum, the reinforcing body protuberances 140 of the disclosed V-ribs 122 significantly increase the effective coefficient of friction of the V-rib flanks 132 by displacing moisture and gripping the flanks of a pulley engaged therewith (not shown) in spite of the presence of water. In several embodiments, the resulting wet effective coefficient of friction is about 0.8 as seen in Table 1 below. In other embodiments, the wet effective coefficient of friction is about 0.9 to about 1. In yet another embodiment, the wet effective coefficient of friction was measured to be about 0.6.

Figure 9:
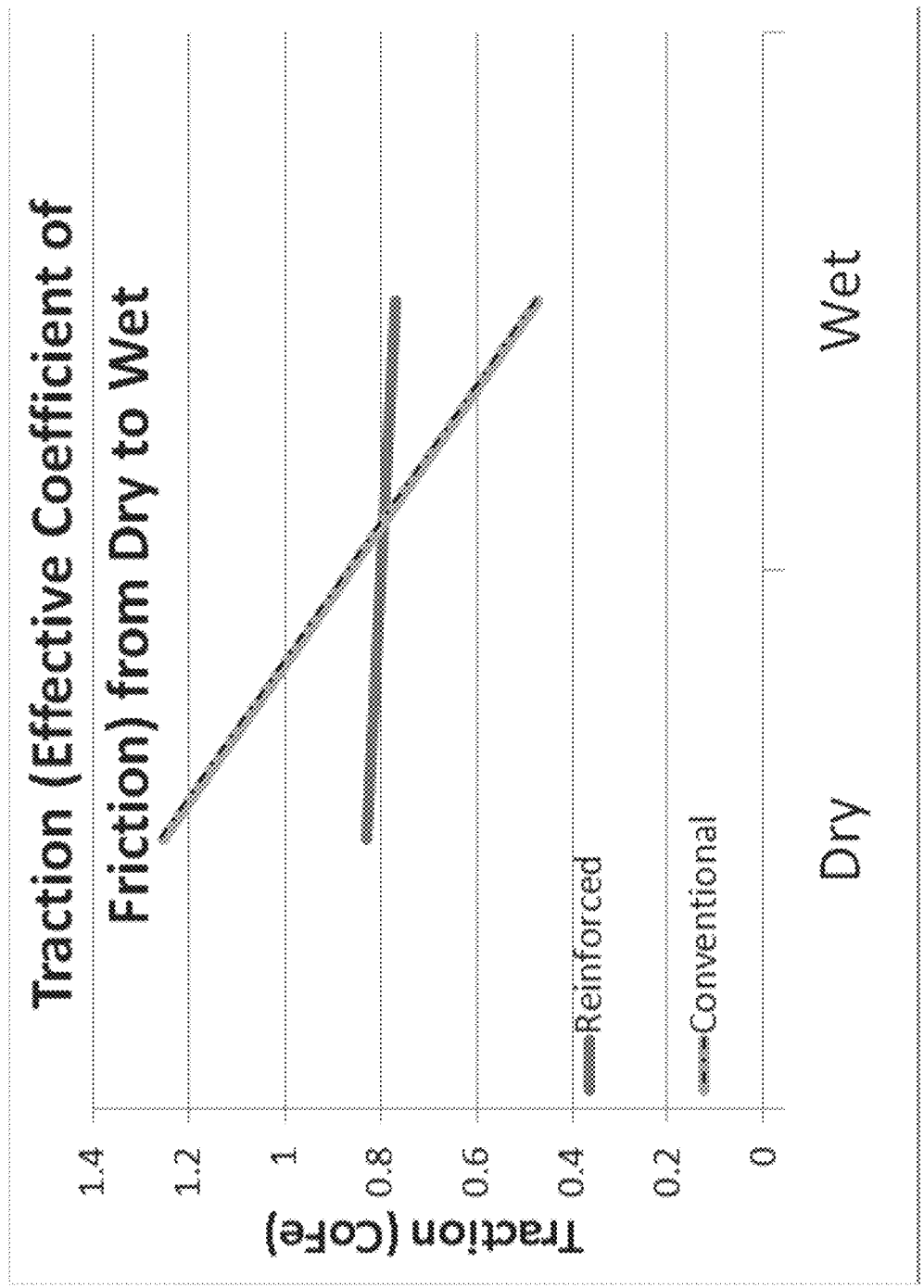
FIG. 9 is a graph of the traction, i.e., effective coefficient of friction, of a conventional belt and an inventive belt disclosed herein as conditions change from dry to wet.

In one embodiment, the belt 102, as a result of the presence of the reinforcing bodies 130, has a coefficient of friction under/in dry conditions that is substantially equal to the coefficient of friction under/in wet conditions. As used herein "substantially equal" means that the two coefficient of friction values are with about 20% of one another. This improvement is graphically illustrated in FIG. 9. The graph shows that conventional belts, those made of the same materials as the disclosed belts, except for the presence of the reinforcing bodies, experience a sharp decline in the effective coefficient of friction as the conditions change from dry to wet. Conversely, the inventive belt has a generally consistent effective coefficient of friction. Here, the Reinforced Belt tested for FIG. 9 had about 800 bundles per square inch included in the compression section. This belt is advantageous because it results in consistent belt performance under most operating conditions.

EXAMPLES

Figure 7:
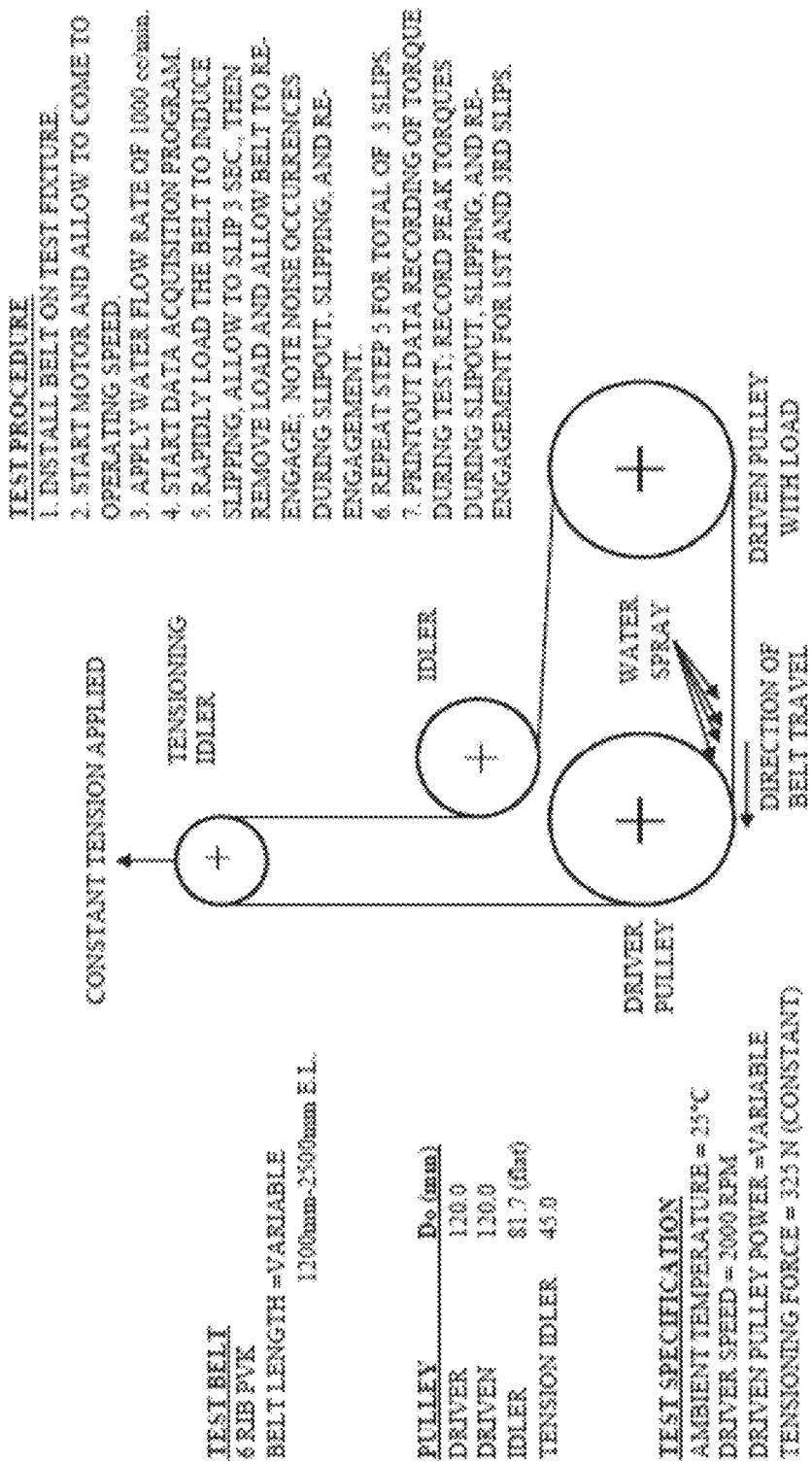
FIG. 7 is a schematic and instructions for wet slip test #89-222.
Figure 8:
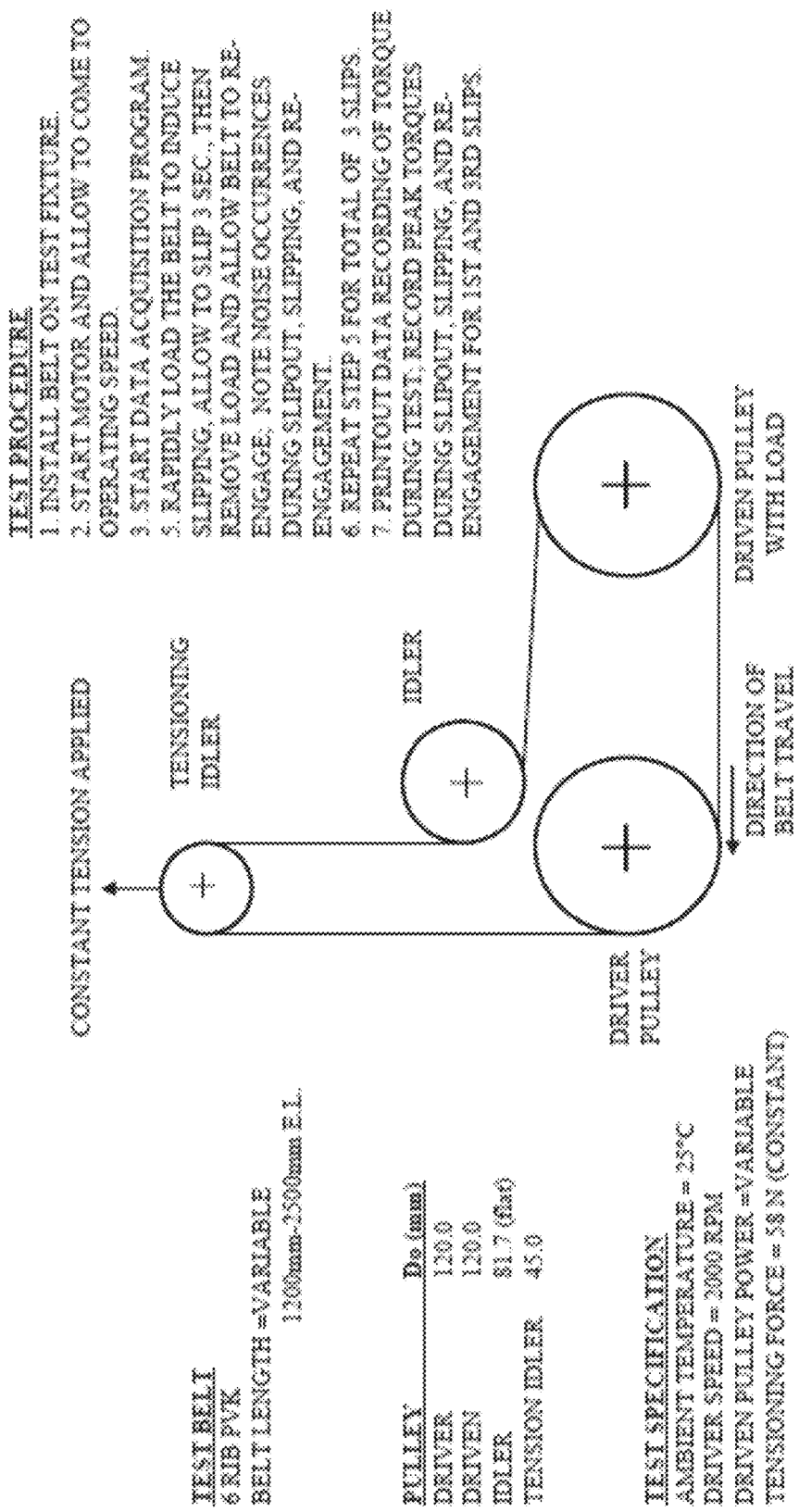
FIG. 8 is a schematic and instructions for dry slip test #89-338.

Belts having reinforcement bundles in the compression section, in particular, with ends of the reinforcement bundles exposed in the flanks of the V-ribs, identified in Table 1 as belts R1-R14, were tested to determine the wet traction (i.e., wet effective coefficient of friction). The wet traction was measured according to the test conditions set forth in FIG. 7. R1-R14 were compared to conventional belts having fiber loading in the rubber forming the compression section, which were tested by the same method.

TABLE 1

| Existing Belts | Compression Section (V-rib) Conventional Structure | Encapsulating Rubber | Reinforcement Bundles/sq. inch | Reinforcement Location in V-ribs | Wet Traction (µ) |
|---|---|---|---|---|---|
| C1 | Homogeneous Fiber Loading in EPDM | na | 0.0 | na | 0.452 |
| C2 | Homogeneous Fiber Loading in EPDM | na | 0.0 | na | 0.444 |
| C3 | Homogeneous Fiber Loading in EPDM | na | 0.0 | na | 0.53 |
| C4 | Non-Homogenous Fiber Loading in CR | na | 0.0 | na | 0.436 |
| C5 | Homogeneous Fiber Loading in EPDM | na | 0.0 | na | 0.523 |
| C6 | Homogeneous Fiber Loading in EPDM | na | 0.0 | na | 0.57 |

| Belts | Compression Section (V-rib) Structure | Encapsulating Rubber | Reinforcement Bundles/sq. inch | Reinforcement Location in V-ribs* | Wet Traction (µ) |
|---|---|---|---|---|---|
| R1 | Rubber Encapsulated Reinforcement Bundles | EPDM w/Fiber | 258.4 | Mid | 0.762 |
| R2 | Rubber Encapsulated Reinforcement Bundles | EPDM w/Fiber | 258.4 | Mid | 0.862 |
| R3 | Rubber Encapsulated Reinforcement Bundles | EPDM w/Fiber | 516.8 | Base and Mid | 0.882 |
| R4 | Rubber Encapsulated Reinforcement Bundles | EPDM w/Fiber | 516.8 | Mid | 0.895 |
| R5 | Rubber Encapsulated Reinforcement Bundles | EPDM w/Fiber | 516.8 | Mid and Tip | 0.938 |
| R6 | Rubber Encapsulated Reinforcement Bundles | EPDM w/Fiber | 516.8 | Mid and Tip | 0.939 |

TABLE 1-continued

| | | | | | |
|---|---|---|---|---|---|
| R7 | Rubber Encapsulated Reinforcement Bundles | EPDM w/Fiber | 775.2 | Base, Mid, and Tip | 0.84 |
| R8 | Rubber Encapsulated Reinforcement Bundles | EPDM w/Fiber | 810.5 | Tip | 0.792 |
| R9 | Rubber Encapsulated Reinforcement Bundles | EPDM w/Fiber | 1215.7 | Mid and Tip | 0.93 |
| R10 | Rubber Encapsulated Reinforcement Bundles | EPDM | 516.8 | Base and Mid | 0.782 |
| R11 | Rubber Encapsulated Reinforcement Bundles | EPDM | 2384.5 | Base, Mid, and Tip | 1.02 |
| R12 | Rubber Encapsulated Reinforcement Bundles | EPDM | 3054.0 | Base, Mid, and Tip | 0.633 |
| R13 | Rubber Encapsulated Reinforcement Bundles | CR | 1215.7 | Mid and Tip | 0.808 |
| R14 | Rubber Encapsulated Reinforcement Bundles | CR | 1621.0 | Base, Mid, and Tip | 0.879 |

In Table 1, conventional belts are represented by C1 through C6. These belts include varied levels of known fiber reinforcement within the belt. Conventional belt C4 demonstrates that disrupting the otherwise homogeneous fiber distribution of the fiber loaded belt is not effective at increasing the wet traction of these belts.

The belts made as disclosed herein are the belt trials R1-R14 in Table 1. In each of Trials R1-R14 the belts included reinforcement bundles encapsulated in the rubber forming the compression section. As noted for Trials R1-R9 the reinforcement bundles were included in belts that also included traditional fiber loading. The presence of the reinforcement bundles increased the wet traction for each of these belts as compared to the conventional belts. Belts without the traditional fiber loading were also tested, as seen in Trials R10-R14. Here Trials R10, R11, R13 and R14 demonstrate that fiber in the encapsulating rubber need not be present for increased wet traction values, which will enhance the flex life of the belts and lower manufacturing costs. Belts, as a result of the presence of the reinforcement bundles, all experienced increase wet traction as well.

Figure 10:
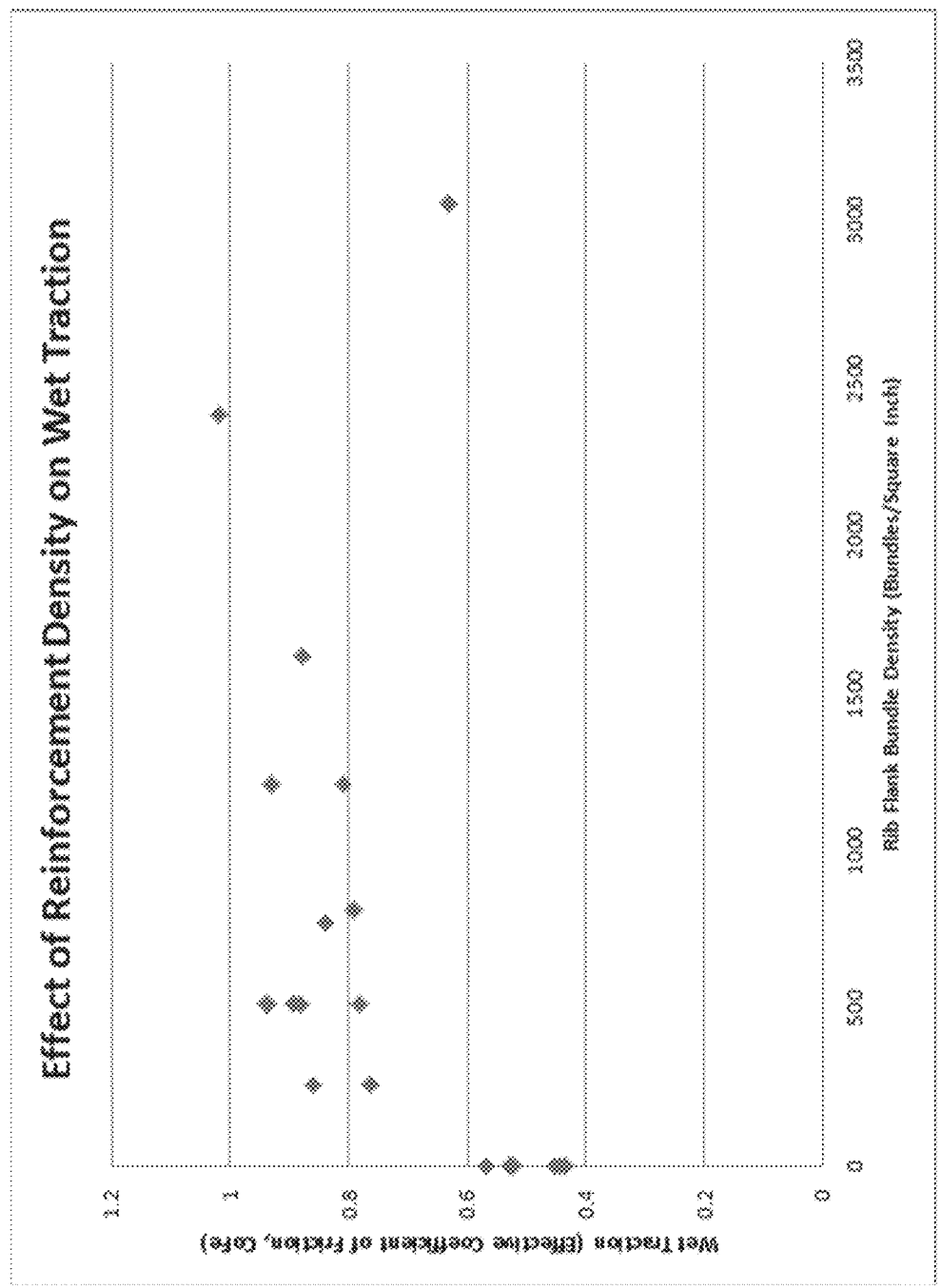
FIG. 10 is a graph plotting the data from Table 1 to demonstrate the effect of reinforcement density on wet traction of belts.

The data of Table 1 is graphically represented in FIG. 10. As seen by the data and FIG. 10, as the bundles per square inch increase toward 2500 bundles per square inch, the wet traction (i.e., effective coefficient of friction of the belt) generally increases. However, when the reinforcement bundles per square inch exceeded 3000 bundles per square inch, their presence negatively impacted the wet traction. This is illustrated by Trial 12 in Table 1. By comparison, those belts without reinforcement bundles (the conventional belts, C1-C6) consistently have a wet effective coefficient of friction less than 0.6.

Besides the bundles per square inch, the placement of the bundles within the compression section, i.e., within the V-ribs, was evaluated. Each V-rib is descriptively divided into a base portion, a mid portion, and a tip portion (each representing a one-third portion of the V-rib). As seen by the data in Table 1, increased wet fraction results when the bundles are encapsulated in the mid portion, the base and mid portions, the mid and tip portions, or the base, mid and tip portion. Trials 1-4 and 10 demonstrate that belts without reinforcement bundles in the tip portion of the V-ribs still achieve increased wet traction values. These embodiments are believed to be advantageous to longer wear life of the belts by reducing the likelihood of cracking in the tips which may results if the reinforcement bundles were present therein.

Figure 3:
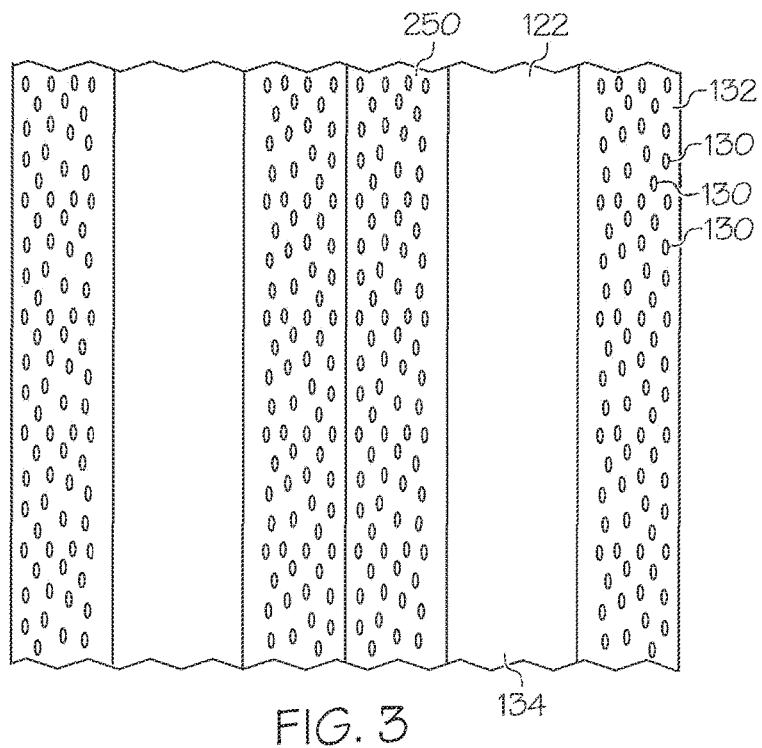
FIG. 3 is a bottom view of the V-ribbed belt of FIG. 2A.
Figure 4:
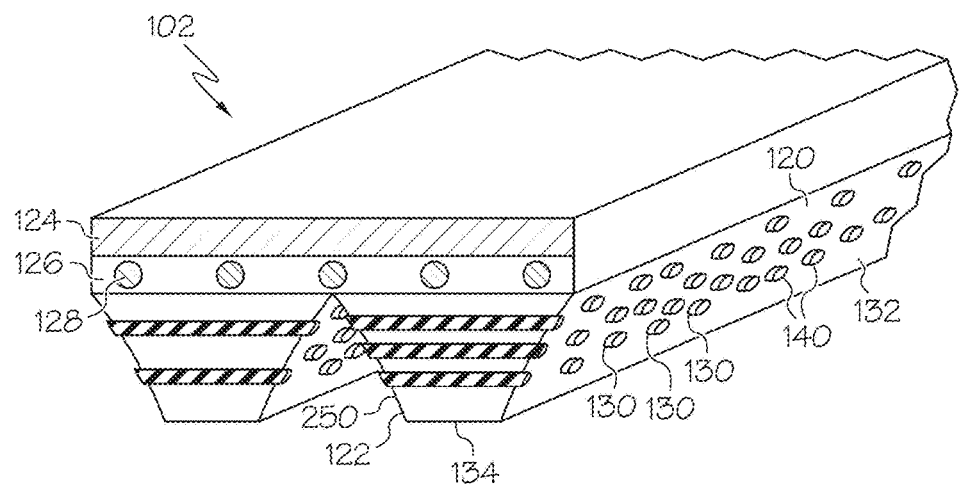
FIG. 4 is an isometric cross-sectional view of the V-ribbed belt of FIG. 2A where the compression section is under a compressive load.
Figure 5:
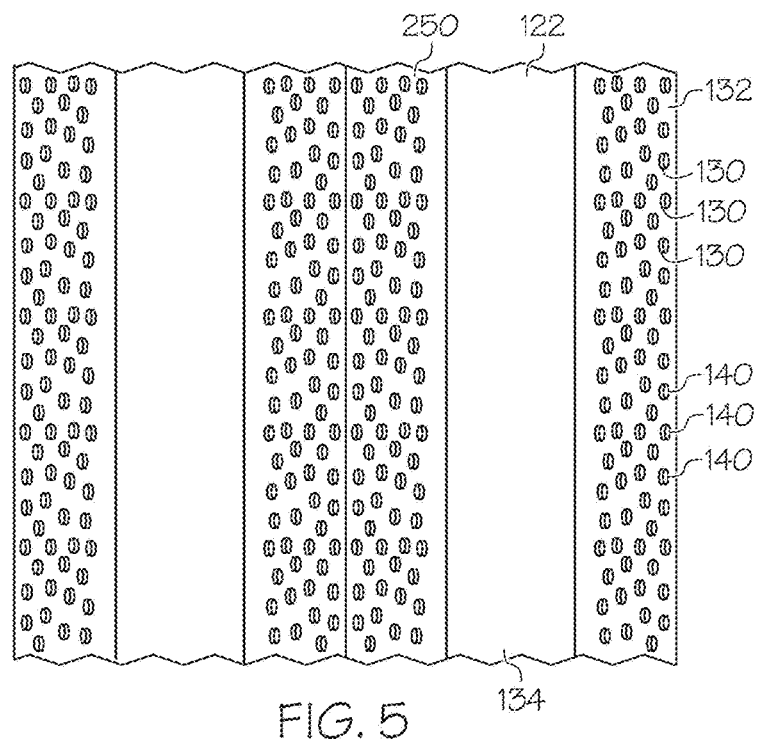
FIG. 5 is a bottom view of the V-ribbed belt of FIG. 4.

FIGS. 4 and 5 show the V-ribbed belt 102 with spaced rib flank enforcement of FIG. 2A in an operative state. In operation, the belt 102 is subjected to a compressive load (not shown), which causes the compression section 120 of the belt 102 to compress. This transitions the outer surface 132 of the V-rib 122 from a generally smooth state where the exposed portions of the reinforcing bodies 130 are generally flush with the surrounding elastomeric material of the V-ribs 122, as depicted in FIGS. 2A and 3, to a textured state where the exposed portions of the reinforcing bodies 130 extend outward from the surrounding elastomeric material of the V-rib 122 to form protuberances 140 on the outer surface 132 of the V-rib 122, as depicted in FIGS. 4 and 5. FIG. 5 shows the V-rib of FIG. 4 from a bottom perspective.

Methods of making the V-ribbed belts 102 described above are explained with reference to FIG. 6. In one embodiment, a method includes the step of forming a tension section 124, a load-carrying section 126, and a compression section 120 such that the compression section has a plurality of generally elongate reinforcing bodies 130 running generally laterally through the compression section 120. The tension section 124 and load-carrying section 126 may be formed by any method well-known to one skilled in the art, and of any materials described above may be used therein. The generally elongate reinforcing bodies 130 may be added to the compression section by plying a plurality of selectively thin layers of elastomeric material while placing the elongate reinforcing bodies 130 between the selected layers and arranging them laterally across the width of the compression section 120. The reinforcing bodies 130 may also be kneaded into or otherwise covered by the preferably elastomeric material to vary and randomize the location while still maintaining generally lateral placement. The resultant belt will be generally flat on all sides, with the reinforcing bodies 130 encased within the body of the compression section 120.

Figure 6:
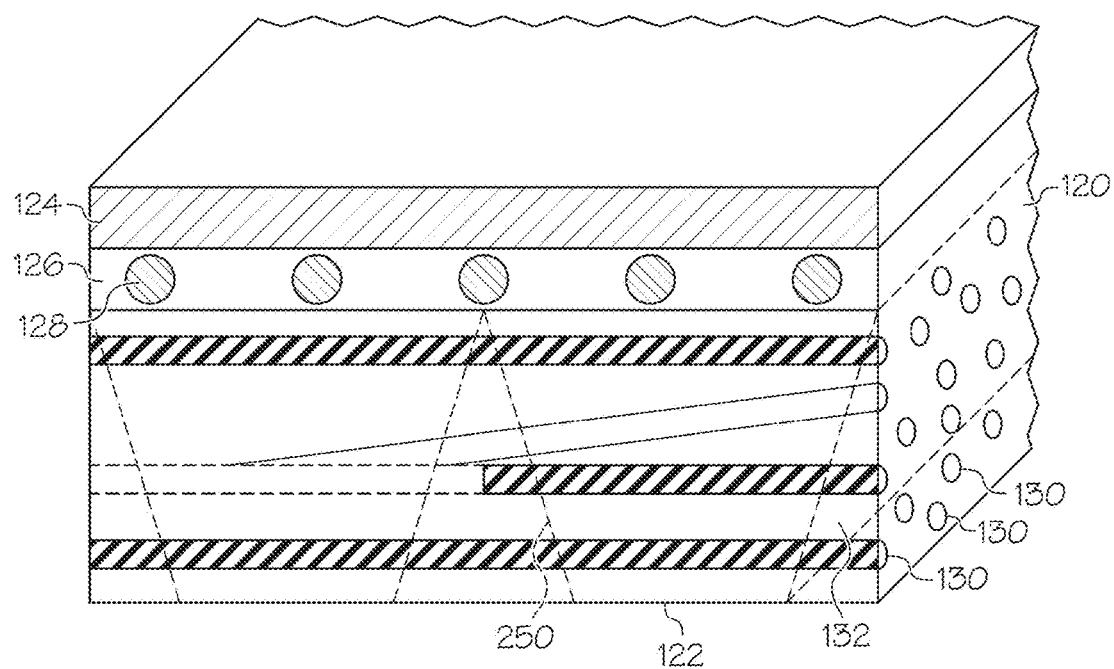
FIG. 6 is an isometric cross-sectional view of the belt of FIG. 2A prior to the cutting of the V-rib, including perforations indicating where the V-ribs are to be cut.

Subsequently, the V-ribs 122 are cut into the compression section 120 along the dashed lines illustrated in FIG. 6. The compression section is cut without regard for the locations of the reinforcing bodies 130, such that both the elastic material comprising the majority of the compression section 120 and the reinforcing bodies 130 are simultaneously cut as the V-ribs are formed. The resultant V-ribbed belt is substantially the V-ribbed belt 102 of FIG. 2A. The resulting flank surfaces 132, 250 of the newly-formed V-ribs 122 should preferably be smooth, yet include portions of elastic material and portions of exposed reinforcing bodies 130. The V-rib cuts may be made by any process known to one skilled in the art, including, but not limited to, fly cutting, knife cutting, or grinding. The V-rib cuts may be made tailored to meet the size requirements of a specific pulley.

Having described the invention in detail and by reference to specific embodiments thereof, it will be apparent that numerous modifications and variations are possible without departing from the spirit of the invention as defined by the following claims.

What is claimed:

1. A V-ribbed belt comprising:
a compression section comprising a material having at least one laterally spaced, longitudinally extending V-rib having a first longitudinally extending flank and a second longitudinally extending flank, the V-rib comprising:
an elastomeric material encapsulating a plurality of reinforcing bodies arranged generally laterally within the V-rib such that at least a portion of the reinforcing bodies form part of one or more of the first and second longitudinally extending flanks;
wherein the compression section has an uncompressed state and a compressed state, wherein the first and second longitudinally extending flanks of the V-rib are generally flat in the uncompressed state, and the plurality of reinforcing bodies form a plurality of protuberances on the first and second longitudinally extending flanks of the V-rib in the compressed state;
wherein the plurality of reinforcing bodies are individual cords dispersed non-uniformly throughout the elastomeric material.

2. The V-ribbed belt of claim 1, wherein the elastomeric material is rubber.

3. The V-ribbed belt of claim 1, wherein the elastomeric material is homogenous.

4. The V-ribbed belt of claim 1, wherein the plurality of reinforcing bodies are solid rods or fibers.

5. The V-ribbed belt of claim 4, wherein the reinforced bodies are made of a material selected from the group consisting of cotton, polyester, nylon, polyamide, aramid, rayon, graphite, carbon, fiberglass, and any combination thereof.

6. The V-ribbed belt of claim 5, wherein the reinforced bodies are made of nylon 6, nylon 66, or combinations thereof and have a denier in the range of 200 to 9000.

7. The V-ribbed belt of claim 1, wherein the reinforcing bodies are bundles of a plurality of strands, the bundles each having a diameter between about 0.1 millimeters and about 0.8 millimeters.

8. The V-ribbed belt of claim 7, wherein the bundles are spaced within the V-rib between about 250 bundles per square inch and about 2500 bundles per square inch.

9. The V-ribbed belt of claim 8, wherein the reinforced bodies are made of a material selected from the group consisting of cotton, polyester, nylon, polyamide, aramid, rayon, graphite, carbon, fiberglass, and any combination thereof.

10. The V-ribbed belt of claim 1, wherein a maximum of about 40% of the reinforcing bodies are disposed within the compression section in a one-third portion thereof closest to a tip.

11. The V-ribbed belt of claim 1, wherein the reinforced bodies are made of a material selected from the group consisting of cotton, polyester, nylon, polyamide, aramid, rayon, graphite, carbon, fiberglass, and any combination thereof.

12. The V-ribbed belt of claim 1, wherein the elastomeric material has a first dry coefficient of friction, the plurality of reinforcing bodies have a second dry coefficient of friction, and the first dry coefficient of friction is greater than the second dry coefficient of friction.

13. The V-ribbed belt of claim 12, wherein the compression section has a coefficient of friction with a value between the first dry coefficient of friction and the second dry coefficient of friction, such that a resulting wet traction, effective coefficient of friction, is about 0.7 to about 1.6.

14. The V-ribbed belt of claim 12, wherein the compression section has a coefficient of friction with a value between the first dry coefficient of friction and the second dry coefficient of friction, such that a resulting effective coefficient of friction in dry conditions is substantially equal to an effective coefficient of friction in wet conditions.

15. The V-ribbed belt of claim 1, wherein the plurality of reinforcing bodies are a plurality of elongate reinforcing bodies arranged between the first and second longitudinally extending flanks with at least a portion of the ends of the reinforcing bodies at the surface of the first longitudinally extending flank and a portion of the ends of the reinforcing bodies at the surface of the second longitudinally extending flank, and the compression section includes about 250 elongate reinforcing bodies per square inch to about 2500 elongate reinforcing bodies per square inch.

16. The V-ribbed belt of claim 15, wherein the compression section includes an elastomeric material.

17. The V-ribbed belt of claim 16, wherein the elastomeric material is homogenous.

18. The V-ribbed belt of claim 15, wherein the flank surfaces have a wet effective coefficient of friction about 0.7 to about 1.6.

19. The V-ribbed belt of claim 15, wherein the effective coefficient of friction of the flank surfaces in dry conditions is substantially equal to the effective coefficient of friction of the flank surfaces in wet conditions.

20. The V-ribbed belt of claim 15, wherein the elongate reinforcing bodies traverse the V-rib in generally parallel planes relative to one another.

* * * * *